United States Patent
Bae et al.

(10) Patent No.: US 10,032,101 B2
(45) Date of Patent: Jul. 24, 2018

(54) SMART MULTI-CARD

(71) Applicant: Brilliantts Co., Ltd., Seongnam-si (KR)

(72) Inventors: Jae Hun Bae, Seongnam-si (KR); Jae Ho Bae, Daejeon (KR)

(73) Assignee: Brilliantts Co., Ltd., Seongnam-si (KR)

( * ) Notice: Subject to any disclaimer, the term of this patent is extended or adjusted under 35 U.S.C. 154(b) by 0 days.

(21) Appl. No.: 15/326,426

(22) PCT Filed: Jul. 13, 2015

(86) PCT No.: PCT/KR2015/007264
§ 371 (c)(1),
(2) Date: Jan. 13, 2017

(87) PCT Pub. No.: WO2016/010320
PCT Pub. Date: Jan. 21, 2016

(65) Prior Publication Data
US 2017/0213120 A1    Jul. 27, 2017

(30) Foreign Application Priority Data

Jul. 14, 2014  (KR) .......... 10-2014-0088649
Nov. 20, 2014  (KR) .......... 10-2014-0162775

(51) Int. Cl.
*G06K 19/06* (2006.01)
*G06K 19/07* (2006.01)
(Continued)

(52) U.S. Cl.
CPC ....... *G06K 19/07* (2013.01); *G06K 19/06028* (2013.01); *G06K 19/06037* (2013.01); *G06Q 20/3278* (2013.01); *G06Q 20/341* (2013.01)

(58) Field of Classification Search
CPC ............ G06K 19/07749; G07F 7/1008; G06Q 20/341
(Continued)

(56) References Cited

U.S. PATENT DOCUMENTS 5,857,079 A    1/1999  Claus et al.
7,594,611 B1 *  9/2009  Arrington ............ G06Q 20/341
                                                          235/487
(Continued)

FOREIGN PATENT DOCUMENTS

EP    0650142    10/2002
EP    2172952    4/2010
(Continued)

OTHER PUBLICATIONS

International Search Report dated Oct. 19, 2015 for International Application No. PCT/KR2015/007264.
(Continued)

*Primary Examiner* — Ahshik Kim
(74) *Attorney, Agent, or Firm* — H.C. Park & Associates, PLC (57) ABSTRACT

A smart multi-card may include: a frame; a wireless communication unit configured to transmit or receive data to or from a card terminal or a communication device through wireless communication; an information storage unit configured to store card information relating to a plurality of cards; a user input unit configured to receive a user input from a user to select card information corresponding to one of the plurality of cards; a display unit configured to visually display the selected card information; and a processor configured to extract the card information selected by the user from the information storage unit, process the card infor-
(Continued)

mation, deliver the processed card information to the display unit, and process the data transmitted or received through the wireless communication unit.

19 Claims, 5 Drawing Sheets

(51) Int. Cl.
*G06Q 20/34* (2012.01)
*G06Q 20/32* (2012.01)

(58) Field of Classification Search
USPC .................................................. 235/492, 380
See application file for complete search history.

(56) References Cited

U.S. PATENT DOCUMENTS

| | | |
|---|---|---|
| 8,317,103 B1 | 11/2012 | Foo et al. |
| 8,727,219 B1 | 5/2014 | Mullen |
| 9,704,088 B2 | 7/2017 | Mullen et al. |
| 2002/0175207 A1 | 11/2002 | Kashef et al. |
| 2004/0010462 A1 | 1/2004 | Moon et al. |
| 2006/0151614 A1 | 7/2006 | Nishizawa et al. |
| 2008/0065535 A1 | 3/2008 | Gangi |
| 2008/0121723 A1 | 5/2008 | Asai et al. |
| 2008/0201265 A1 | 8/2008 | Newton |
| 2009/0261161 A1 | 10/2009 | Blossom |
| 2009/0261166 A1 | 10/2009 | Lawson et al. |
| 2010/0096465 A1 | 4/2010 | Stagg |
| 2011/0016025 A1 | 1/2011 | Gaisford |
| 2011/0028184 A1 | 2/2011 | Cooper |
| 2011/0295748 A1 | 12/2011 | Woodriffe |
| 2012/0024945 A1* | 2/2012 | Jones .................... G07F 7/0833 235/379 |
| 2012/0085826 A1* | 4/2012 | Talker .................... G06K 19/08 235/492 |
| 2012/0168500 A1* | 7/2012 | Li ...................... G06K 19/0718 235/382 |
| 2013/0048712 A1 | 2/2013 | Guillaud et al. |
| 2013/0134216 A1 | 5/2013 | Spodak et al. |
| 2013/0248594 A1 | 9/2013 | Soom |
| 2014/0040128 A1 | 2/2014 | Park |
| 2014/0059496 A1 | 2/2014 | White et al. |
| 2014/0084059 A1* | 3/2014 | Sierchio ............. G06K 19/0719 235/380 |
| 2014/0289671 A1 | 9/2014 | Ohmori et al. |

FOREIGN PATENT DOCUMENTS

| | | |
|---|---|---|
| JP | 10-502193 | 2/1998 |
| JP | 2007-233302 | 9/2007 |
| JP | 2014-119783 | 6/2014 |
| KR | 10-2010-0013668 | 2/2010 |
| KR | 10-2014-0065114 | 5/2014 |
| WO | 2005091212 | 9/2005 |
| WO | 2013/028930 | 2/2013 |

OTHER PUBLICATIONS

International Search Report dated Sep. 25, 2015, in International Application No. PCT/KR2015/007273.
International Search Report dated Oct. 19, 2015, in International Application No. PCT/KR2015/007276.
The Extended European Search report dated Sep. 20, 2017 in European Application No. 15821326.4.
The Extended European Search report dated Jul. 19, 2017 in European Application No. 15861451.1.
Notice of Allowance dated Jan. 22, 2018, issued in U.S. Appl. No. 15/326,367.
Non Final Office Action dated Sep. 8, 2017, issued in U.S. Appl. No. 15/326,367.
Notice of allowance dated Sep. 5, 2017, issued in U.S. Appl. No. 15/326,416.
Corrected Notice of Allowability dated Sep. 18, 2017, issued in U.S. Appl. No. 15/326,416.
Notification of Reasons for Refusal dated Feb. 6, 2018, issued in Japanese Patent Application No. 2017-523747.

* cited by examiner

SMART MULTI-CARD

CROSS-REFERENCE TO RELATED APPLICATIONS

This application is the National Stage Entry of International Application PCT/KR2015/007264, filed on Jul. 13, 2015, and claims priority from and the benefit of Korean Patent Application No. 10-2014-0088649, filed on Jul. 14, 2014 and Korean Patent Application No. 10-2014-0162775, filed on Nov. 20, 2014, which are incorporated herein by reference for all purposes as if fully set forth herein.

BACKGROUND

Field of the Invention

The invention relates generally to a smart multi-card, and more particularly, to a smart multi-card containing information relating to multiple cards and which simplifies the user's ability to make payments, accumulate rewards, and authentication.

Discussion of the Background

As modern society has rapidly become information-based and credit-based after industrialization, the use of credit cards, which are referred to as "plastic money," has increased to be as prevalent as cash. Accordingly, the number of credit cards carried by a regular adult has also significantly increased, and thus each person uses at least two or three cards, and in some cases, ten or more cards are held and used. Also, various rewards cards have been issued and are used as an essential marketing tool in most business to consumer (B2C)-based corporations, and are widely used to promote sales at small stores or shopping centers.

Accordingly, a large number of credit cards and reward cards are being issued and many are unnecessary and/or discarded, thereby generating unnecessary issuing costs and social costs. Furthermore, the reward cards or discount cards issued from individual stores may be utilized only when the consumer possesses such cards during their visits. This causes consumers to avoid use of these cards due to inconvenient and complex card management, and causes generation of unnecessary marketing costs to businesses.

For example, credit cards are generally considered to have better utilization than rewards cards. The average number of credit cards issued to each consumer increased to 4 in 2001, stopped increasing for a while after the credit card liquidity crisis, and then continued to increase to 4.9 in 2011. The total number of credit cards that has been issued reached approximately 122,130,000 in 2011.

However, the average number of cards that are actually used by each consumer is only 1.4 despite the increasing number of issued cards. As a result, most credit cards issued to each consumer become dormant, and about 20,000,000 or more cards (corresponding to about 40,000,000,000 Korean won or more) are being discarded. Considering that the above figure included various cash replacement cards including debit cards, check cards, cash cards, and prepaid cards or marketing cards such as rewards cards or discount cards, astronomical costs are being wasted on dormant or discarded cards.

SUMMARY

Smart multi-cards constructed according to the principles of the invention can solve one or more of the above problems by simplifying the user's ability to make payments, accumulate rewards, or authentication by including information relating to multiple cards, and allowing the user to conveniently select a card among the multiple cards by operation of a user input unit, and to use various payment methods and charging methods.

According to a first aspect of the invention, a smart multi-card may include: a frame; a wireless communication unit configured to transmit or receive data to or from a card terminal or a communication device through wireless communication; an information storage unit configured to store card information relating to a plurality of cards; a user input unit configured to receive a user input from a user to select card information corresponding to one of the plurality of cards; a display unit configured to visually display the selected card information; and a processor configured to extract the card information selected by the user from the information storage unit, process the card information, deliver the processed card information to the display unit, and process the data transmitted or received through the wireless communication unit.

The smart multi-card may further include: a connector configured to exchange data with a contact card terminal.

The wireless communication unit may include a Bluetooth low energy (BLE) module configured to receive card information from the communication device or receive a control command of the smart multi-card from the communication device; and the processor may be configured to transform the card information into a format corresponding to a storage format of the information storage unit.

The wireless communication unit may include a near field communication (NFC) module configured to exchange data with the communication device through wireless communication or perform contactless payment through the card terminal.

The smart multi-card may further include: an interface unit configured to transform data formats of the information storage unit and the processor into the same format when the data formats are different.

The smart multi-card may further include: a power supply unit configured to supply power to the smart multi-card; and an external port connection unit configured to connect to an external power source to perform charging or connect to an external device to perform data exchange therewith.

The power supply unit may be wirelessly chargeable.

The smart multi-card may further include: a solar cell provided on a surface of the card frame and configured to charge the power supply unit.

The smart multi-card may have idle and active states and is switchable from a idle state to an active state in response to user input received through the user input unit.

The information storage unit may store settings for a frequently-used card; and information corresponding to the frequently-used card may be loaded from the information storage unit when the smart multi-card is switched from the idle state to the active state.

The user input unit may include at least one of: a button input method in which a card is changed or selected by directional buttons and a selection button, and a touch pad method in which a card is changed or selected by receiving a touch operation input from the user.

The display unit may be configured to display card information including at least one of a bar code, a card number, and a Quick Response (QR) code, when the selected card is a reward card.

The display unit may be configured to display a type of the identification card, when the selected card is a user identification card; and the processor may be configured to process information of the user identification card loaded from the information storage unit and deliver the processed information to the wireless communication unit or the connector.

The display unit and the user input unit may be a touchscreen.

The display unit may include electronic paper.

The processor may be configured to generate a user interface for receiving setting items from the user through information processing and provide the generated user interface to the display unit; and the information storage unit may store the setting items received from the user through the user input unit.

The processor may be configured to recognize a wireless communication signal received from the communication device when the smart multi-card is linked with the communication device, and configured to stop the operation of the smart multi-card in response to the wireless communication signal not being received.

The wireless communication unit may be configured to receive information relating to a payment history or reward accumulation history from the card terminal; the processor may be configured to process the received information to display the information on the display unit; and the display unit may be configured to display the payment history or reward accumulation history.

The processor may include a payment control module configured to control a card payment function and an operation control module configured to control operations of the smart multi-card other than payments.

The smart multi-card may further include a magnetic strip driving unit configured to generate a magnetic strip based on the card information processed by the processor.

According to the invention, the following various effects can be obtained.

First, the smart multi-card according to an exemplary embodiment of the invention may improve ease of carrying cards because all card data for payment and accumulation is stored into a single card. Also, wallet weight of the user may be reduced by reducing the number of cards carried by the user.

Second, the smart multi-card according to an exemplary embodiment of the invention may include a wireless communication unit, a connector, and a magnetic strip, and thus can provide various payment methods such as a payment method using a magnetic strip, a contact payment method, a contactless payment method, and a payment method using a communication device. Accordingly, the user may apply a method corresponding to the user's situation to perform payment.

Third, the smart multi-card may be linked with a communication device, and thus disallow payment when a distance between the smart multi-card and the communication device is at a certain distance or more. Thus, the security of personal information may be improved and an unauthorized payment when a card is lost or stolen may be prevented or reduced.

Fourth, the smart multi-card may be issued or stored through a wired connection with another device such as a communication device or a wireless connection with a card terminal or a communication device. Accordingly, information on several cards may be stored in a single card.

Fifth, the smart multi-card may display card information through a display unit, thus allowing the user to check which card is selected for payment.

Sixth, the smart multi-card may include a user input unit so that the user may manipulate a card. In particular, the user input unit and a display unit may be a touchscreen, and the touchscreen may have improved convenience in that the card manipulation can be immediately performed while the display unit is being checked, and the smart multi-card may have reduced thickness because separate input elements such as a keypad is not necessary.

Seventh, the smart multi-card may include a idle mode function. Accordingly, unnecessary power consumption thereof may be reduced and therefore, the number of times of charging may be reduced. Thus, the smart multi-card may have improved power management and may reduce the concern of the user to charge the smart multi-card.

Eighth, the smart multi-card may store and display a card that is frequently used by the user. Thus, the time spent by the user to select the frequently-used card and load card information thereof may be reduced.

Ninth, the smart multi-card may include a solar cell, and thus may be charged anywhere under the sunlight. Thus, the user may not need to find a separate charging place. Also, the solar cell can be provided at one side of a rear surface of a frame on which separate elements of the smart multi-card are not disposed. Thus, charging the smart multi-card using the solar cell by exposing the rear surface to sunlight may not interfere with the user's use of the smart multi-card.

Tenth, the smart multi-card may be charged through wireless charging. Wireless charging may have improved convenience in that the user may charge the smart multi-card without directly connecting the card to a power source. Wireless charging may also have improved convenience in that the user may automatically charge and use the smart multi-card may reduced the concern of the user to charge the smart multi-card.

Eleventh, the smart multi-card may receive information on a payment history or reward accumulation history from a card terminal. Thus, the user may check the payment history or the reward accumulation history without receiving a receipt. Also, it is possible to reduce costs required to print a receipt.

Twelfth, the smart multi-card may transmit received payment history information to a communication device. Thus, the user may transmit payment history information may be stored to the communication device and store the payment history information without a receipt is not issued and may immediately utilize accumulated data, for example, to create a household accounting book on the basis of the payment history information. Also, the user may reduce the cost for a commercial payment messaging service to check and store the payment information in the communication device.

Thirteenth, the costs for manufacturing multiple cards that are unnecessarily issued and discarded may be reduced by using only one smart multi-card for each user to perform payment or reward accumulation.

DETAIL DESCRIPTION OF THE ILLUSTRATED EMBODIMENTS

Preferred embodiments of the invention will be described below in detail with reference to the accompanying drawings. Advantages and features of the invention and methods of accomplishing the same should become apparent with reference to embodiments described below in detail in connection with the accompanying drawings. However, the invention is not limited to the embodiments disclosed below and may be implemented in various different forms. Exemplary embodiments are provided only for completing the disclosure of the invention and fully representing the scope of the invention to those skilled in the art. Rather, the scope of the invention is defined only by the claims. Like reference numerals refer to like elements throughout.

Unless otherwise defined, all terms (including technical and scientific terms) used herein have the same meaning as commonly understood by one of ordinary skill in the art to which this invention belongs. It should be further understood that terms, such as those defined in commonly-used dictionaries, should be interpreted as having meanings that are consistent with their meanings in the context of the relevant art and are not to be interpreted in an idealized or overly formal sense unless expressly so defined herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. The terms "comprises" and/or "comprising" used herein specify the presence of stated elements, but do not preclude the presence or addition of one or more other elements.

The term "card information" used herein may include a card name, a card image, a card number, a bar card, a Quick Response (QR) code, etc. when the card is a reward card, may include card company information, a card name, a card company logo, a card image, a card validity period, etc. when the card is a credit card or a check card, and may include a user's photograph, name, and identification number (e.g., a resident registration number, an employee number, a military service number, a certificate number, etc.) when the card is the user identification card (an IC card).

The term "communication device" used herein refers to any type of device capable of wireless communication. That is, "communication device" also includes a device with no wireless communication function that may perform wireless communication when a memory card including a wireless communication chip is inserted therein as well as a device capable of wireless communication, such as a smartphone, a smart watch, a tablet, a notebook, and a desktop.

Also, the term "smart multi-card 100" used herein corresponds to a single card that may include information on one or more cards, unlike a conventional card in which information on only one card is included in an integrated circuit (IC) chip. That is, the smart multi-card 100 is a card used for payment or reward accumulation by loading one piece of pre-stored card information.

Also, the term "card terminal" used herein includes a terminal for paying with a card, a terminal for receiving a reward card number and accumulating rewards, and a terminal for acquiring the user's identification information from the smart multi-card 100 and checking the identification information, and further includes terminals of card companies that issue new cards for the smart multi-card 100, terminals of banks, or terminals of shops. Also, the terminal that performs payment using the card may be referred to as a payment terminal.

Figure 1:
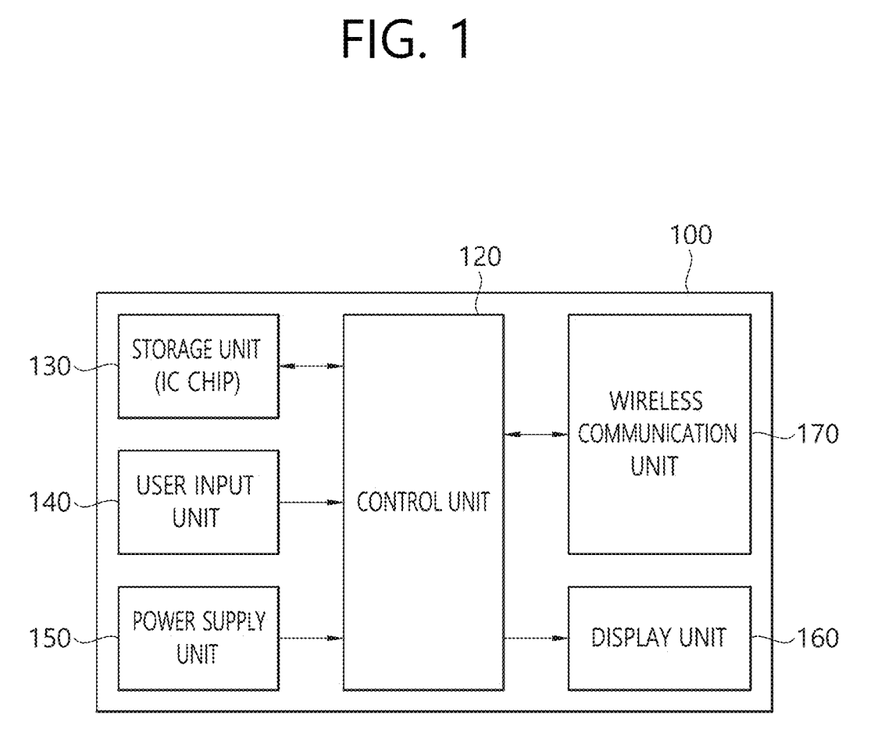
FIG. 1 is a block diagram of an internal system of a smart multi-card according to an exemplary embodiment of the invention.
Figure 2:
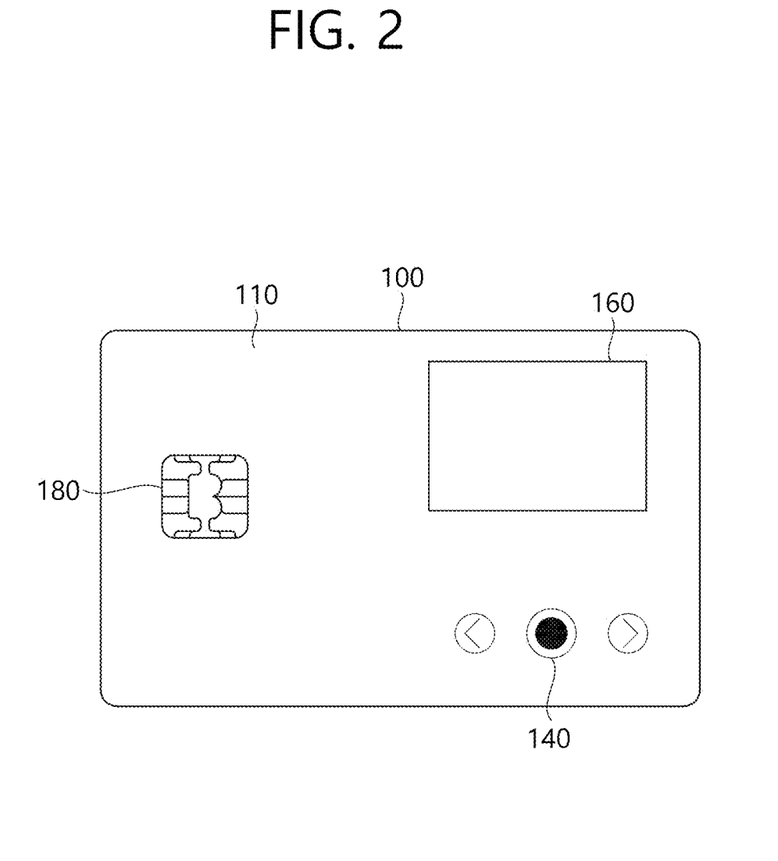
FIG. 2 is a plan view of a smart multi-card according to an exemplary embodiment of the invention.
Figure 3:
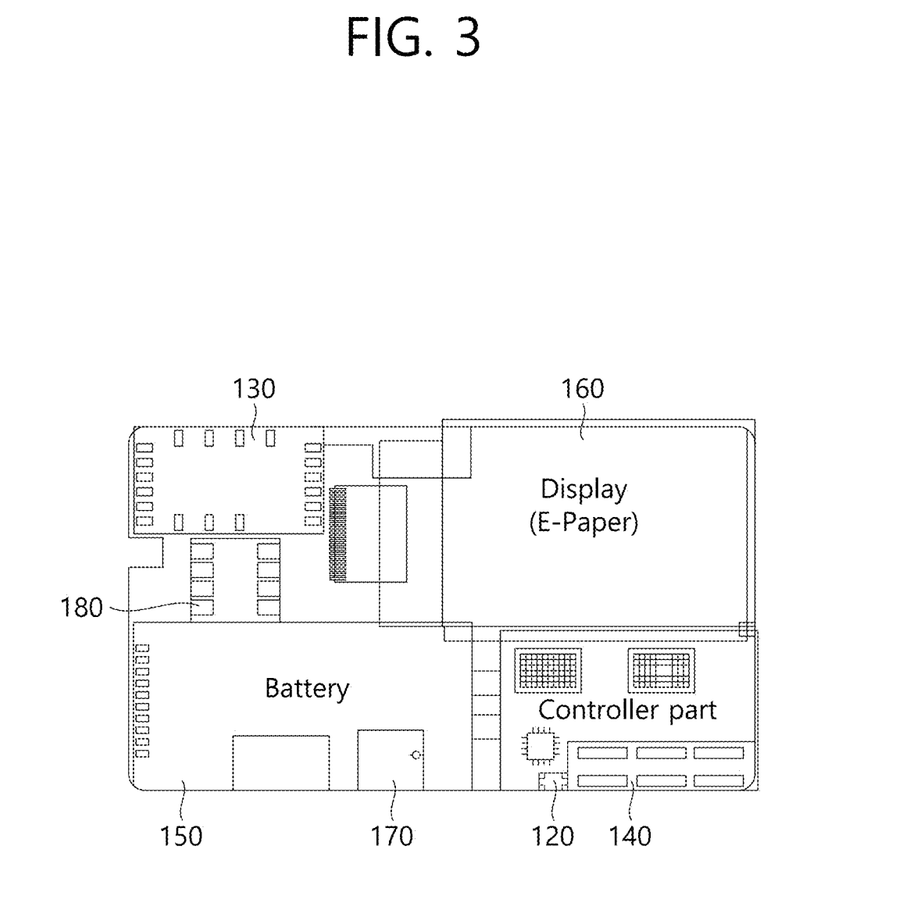
FIG. 3 is a diagram showing an internal arrangement of elements of a smart multi-card according to an exemplary embodiment of the invention.
Figure 4:
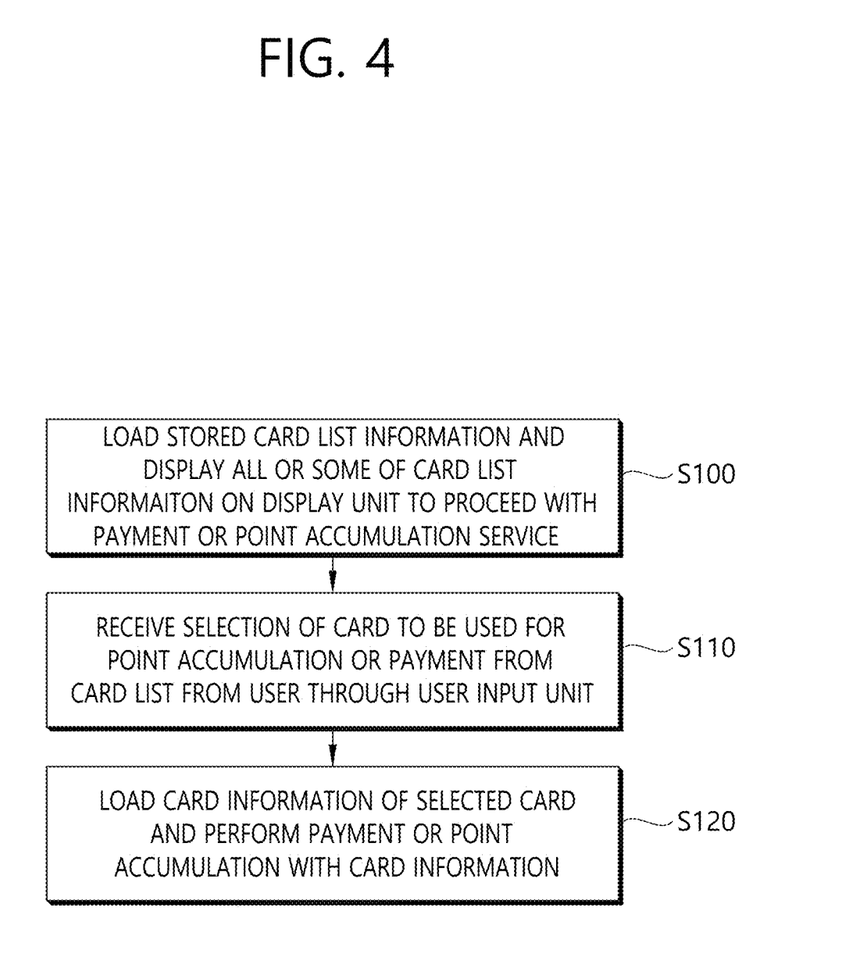
FIG. 4 is a flowchart showing a method of performing payment or reward accumulation using a smart multi-card according to an exemplary embodiment of the invention.
Figure 5:
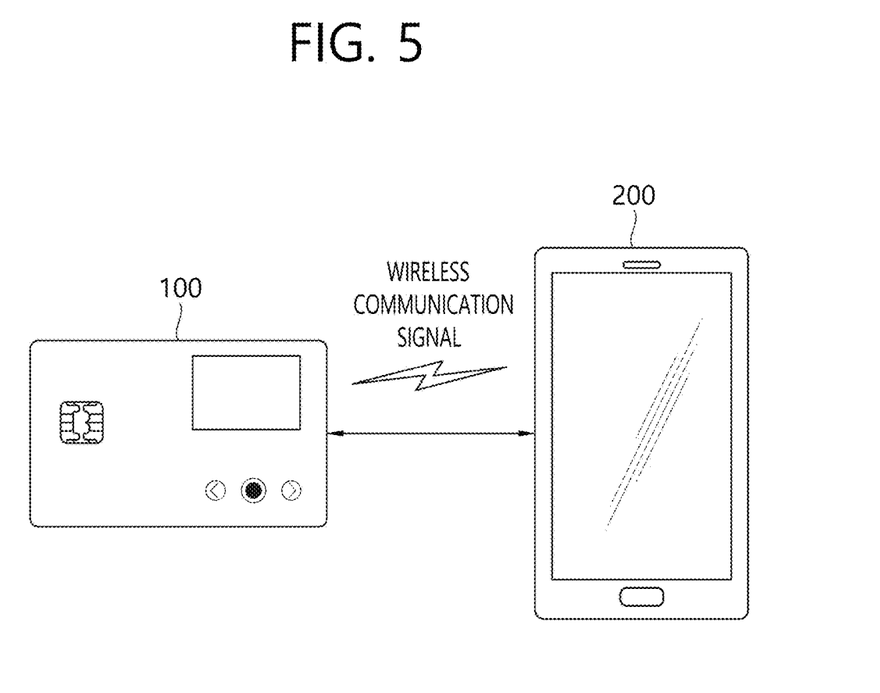
FIG. 5 is a diagram showing a connection between a smart multi-card and a communication device according to an exemplary embodiment of the invention.

FIG. 1 is a block diagram of an internal system of the smart multi-card 100 according to an exemplary embodiment of the invention. FIG. 2 is a plan view of the smart multi-card 100 according to an exemplary embodiment of the invention. FIG. 3 is a diagram showing an internal arrangement of elements of the smart multi-card 100 according to an exemplary embodiment of the invention. FIG. 4 is a flowchart showing a method of performing payment or reward accumulation using the smart multi-card 100 according to an exemplary embodiment of the invention. FIG. 5 is a diagram showing a connection between the smart multi-card 100 and a communication device 200 according to an exemplary embodiment of the invention.

Referring to FIGS. 1, 2, 3, 4, and 5, a smart multi-card 100 includes a support such as a frame 110, a control unit 120, an information storage unit 130, a user input unit 140, a power supply unit 150, a display unit 160, a wireless communication unit 170, a connector 180, and the communication device 200.

Hereinafter, the smart multi-card 100 according to exemplary embodiments of the invention will be described with reference to the accompanying drawings.

FIG. 1 is a block diagram of an internal system of the smart multi-card 100 according to an exemplary embodiment of the invention. FIG. 2 is an example diagram of the smart multi-card 100 according to an exemplary embodiment of the invention. FIG. 3 is diagram showing an internal arrangement of elements of the smart multi-card 100 according to an exemplary embodiment of the invention.

Referring to FIGS. 1, 2, and 3, the smart multi-card 100 according to an exemplary embodiment of the invention includes all or some of the frame 110, the control unit 120, the information storage unit 130, the user input unit 140, the power supply unit 150, the display unit 160, the wireless communication unit 170, and the connector 180.

The frame 110 provides a space in which elements of the card may be disposed. The frame 110 may be formed of various materials such as a synthetic resin or metal. The frame 110 may be formed into one body by producing a front frame and a rear frame and bringing the produced front and rear frames into contact with each other. Thus, the frame 110 may provide an installation space for the card elements. A through hole may be formed in the front frame so that the information storage unit 130 installed therein may be exposed to the outside. However, the frame 110 is not limited to a configuration including the front frame and the rear frame, and may be implemented in various forms, e.g., a form in which elements are inserted into an integrated frame.

Typically, the control unit 120 controls operation of each element of the smart multi-card 100 to control overall operation of the smart multi-card 100, and may be or include a processor. For example, the control unit 120 processes data received from the user input unit 140 and determines the user's command. Also, the control unit 120 processes the data so that the data may be sent to an external card terminal or the communication device 200 through wireless communication or direct contact. For example, when card information is user identification information, the control unit 120 may process the card information loaded from the information storage unit 130 and deliver the processed card information to the wireless communication unit 170 or the connector 180 in order to perform transmission to the card terminal. Also, the control unit 120 stores data received from the card terminal or the communication device 200 through wireless communication or direct contact in the information storage unit 130 of the smart multi-card 100 and displays the data on the display unit 160. Also, the control unit 120 receives data from the card terminal or the communication device 200 or extracts data from the information storage unit 130 and process the data so that the data may be displayed on the display unit 160.

The user input unit 140 receives input data for controlling operation of the smart multi-card 100 from the user and delivers the received input data to the control unit 120. The user input unit 140 may include a keypad, a keyboard, a dome switch, a touch pad (e.g., a capacitive/resistive type), etc. In particular, a touch pad may refer to a touchscreen when the touch pad is formed in a layered structure together with the display unit 160, which will be described below. For example, the user input unit 140 may be implemented in a button input method in which a card is changed or selected by a direction button and a selection button, a touch pad method in which a card is changed or selected by receiving a touch input from the user, etc. Thus, the user input unit 140 receives a user input and performs a selection among information on a plurality of cards.

The wireless communication unit 170 exchanges data with the external communication device 200 or a card terminal. For example, the wireless communication unit 170 may send data to the external communication device 200 or the card terminal through wireless communication in order to perform payment, and may receive card information from the card terminal or the communication device 200 through wireless communication in order to issue a card. Also, the wireless communication unit 170 acquires information needed to perform card payment from its surroundings. For example, in order to find a name, discount information, etc. of a shop that has been visited by the user, the wireless communication unit 170 may receive a radio signal (e.g., a beacon signal) transmitted from the shop. The wireless communication unit 170 may include a wireless Internet module, a short-range communication module, a GPS module, etc.

The wireless Internet module is a module for wireless Internet access. The wireless Internet module may be mounted inside or outside the smart multi-card 100. Wireless LAN (WLAN), wireless fidelity (WiFi), wireless broadband (WiBro), world interoperability for microwave access (Wimax), or high speed downlink packet access (HSDPA) may be used as wireless Internet technology therefor.

The short-range communication module is a module for short range communication. Bluetooth, Bluetooth low energy (BLE), beacon, radio frequency identification (RFID), infrared data association (IrDA), ultra wideband (UWB), ZigBee, near field communication (NFC), etc. may be used as short-range communication technology therefor.

BLE refers to a Bluetooth communication method that has a different packet configuration scheme and a simplified connection procedure when compared to conventional classic Bluetooth, and thus is capable of fast communication. BLE may be applicable to goods used in daily life through an improved protocol so that information read from simple sensors may be quickly and easily delivered. BLE (Bluetooth 4.0) may allow an apparatus to communicate with devices located within a range of about 5 m to 70 m, and also may be always turned on because BLE operates at low power and minimizes power waste with almost no influence on battery life. A BLE module may receive card information to be stored in the information storage unit 130 and a control command of the smart multi-card 100 from the communication device 200 through a BLE method.

A beacon delivers very small frequency signals to its surroundings using Bluetooth 4.0 (BLE) based protocol. The beacon continuously broadcasts the presence of a wireless network, enables a signal receiver to find and join the wireless network, and delivers information to the signal receiver.

An NFC module is a non-contact communication technology, which is one of radio tag (e.g., RFID) technologies, and a communication technology for sending and receiving a variety of wireless data over a short distance, for example, a distance of 10 cm or less. NFC is a next-generation short-distance communication technology that is highlighted in terms of a short communication distance, relatively good security, and a low cost. Since both functions of reading and writing data may be used, there is no need for a dongle (a reader), which is conventionally needed to use RFID. NFC is similar to conventional short-range communication technologies, but does not require settings between devices like in Bluetooth. The NFC module may exchange data with the communication device 200 through wireless communication or may perform contactless payment through a card terminal.

The display unit 160 displays card information to the user. That is, the display unit 160 displays and outputs information processed by the smart multi-card 100. For example, when the smart multi-card 100 is in a payment mode, the display unit 160 may display a user interface (UI) or graphic user interface (GUI) associated with card payment or information on a card used to pay. When the smart multi-card 100 is in a reward accumulation mode (that is, when the selected card is a reward card), the display unit 160 may display a bar code, a number, or a QR code of the reward card. Also, when the smart multi-card 100 is in a user identification mode (that is, when the selected card is a user identification card), the display unit 160 may display the type of identification card. Also, when the smart multi-card 100 is in a card registration mode or card issuance mode in which a card other than pre-stored cards is added, the display unit 160 may display a UI or GUI associated with connection to the communication device 200 or a card terminal. Also, when the smart multi-card 100 is in a user setting mode, the display unit 160 may visually provide a setting UI generated by the control unit 120 so that the user may change settings by controlling the user input unit 140. The display unit 160 may be configured as a graphic type or a segment type.

As described above, when the display unit 160 and a touch pad form a layered structure to constitute a touchscreen, the display unit 160 may be used as an input device as well as an output device. When the display unit 160 is configured as a touchscreen, the display unit 160 may include a touchscreen panel, a touchscreen panel control unit, etc. When the display unit 160 is implemented as the touchscreen, the user may select card information (e.g., a company logo, a card appearance, a card name, etc.) displayed on the display unit 160 by using a touch input, and may change a card by touching a portion of the touchscreen where a card change key is displayed or by touching the touchscreen and then moving (e.g., swiping) along a predetermined path.

When the touch input includes touching the touchscreen 160 and then swiping along a predetermined path, the smart multi-card 100 may change a card classification, change a card type, select a card, unselect a card, etc., according to a touch command input to the touchscreen 160. For example, when the user swipes up and down on the touchscreen 160, the card classification may be changed. That is, the card classification may be changed to a credit card group of the user, a check card group of the user, and a reward card group of the user. For example, when the user swipes left and right on the touchscreen 160, a card type in the card classification may be changed. That is, when the card classification is the credit card group, the user may find and select a credit card to be used for payment by swiping left and right. Also, the user may select or unselect a card by touching a card image, a company logo, etc. displayed on the display unit 160.

In addition, the display unit 160 may include at least one of a liquid crystal display, a thin film transistor-liquid crystal display, an organic light-emitting diode, a flexible display, and electronic paper. According to the exemplary embodiment of the smart multi-card 100, there may be two or more display units 160. For example, the display units 160 may be provided on a front surface and a rear surface of the smart multi-card 100.

Electronic paper is an electronic device that mimics the appearance of paper and may serve as paper, and is also referred to as e-paper. Various methods such as a method of achieving an ink effect using small balls or capsules or a method of achieving a paper effect by making a flat panel display such as a conventional liquid crystal display (LCD) thinner may be applied to electronic paper.

The information storage unit 130 stores information used by the smart multi-card 100. For example, the information storage unit 130 may store card information used for payment or reward accumulation and may store a security certificate of the user. Also, when the smart multi-card 100 includes a user authentication function, the information storage unit 130 may store biometric information of the user to perform user authentication. Also, the information storage unit 130 stores information on a plurality of cards that are issued in the smart multi-card 100 so that the user may use the card information to perform payment, rewards accumulation, or user authentication (hereinafter referred to as "payment or the like").

Also, the information storage unit 130 may store a program for processing and controlling of the control unit 120. For example, the information storage unit 130 may contain an operating system for operating the smart multi-card 100. Also, the information storage unit 130 may provide a work space for card tasks such as encryption and decryption. Also, the information storage unit 130 may be configured in the form of an integrated circuit (IC) chip, and a microprocessor unit (MPU) including the IC chip with a calculation function.

The power supply unit 150 is supplied with internal power or external power by control of the control unit 120 and supplies power needed to operate each element to each of the elements.

The connector 180 exchanges data with a contact card terminal. That is, when the smart multi-card 100 is inserted into the contact card terminal, the connector 180 comes into contact with a card contact unit of the contact card terminal and directly exchanges data therewith. When the information storage unit 130 is configured as an IC chip, the connector 180 may be included in the IC chip. The connector 180 may be exposed to the outside of the frame 110 and come into direct and physical contact with a contact card terminal in order to perform payment.

FIG. 4 is a flowchart showing a method of performing payment or reward accumulation using the smart multi-card 100 according to an exemplary embodiment of the invention.

The method of performing payment or reward accumulation using a smart multi-card according to an exemplary embodiment of the invention will be described with reference to FIG. 4 as follows. In order to proceed with a payment or reward accumulation service, the smart multi-card 100 loads card list information stored in the information storage unit 130 and then displays all or some of the information on the display unit 160 (S100). For example, the smart multi-card 100 loads the card list information (e.g., information including all or some of card company information, a card name, a card company logo, a card image, a card validity period, etc.) stored in the information storage unit 130 and displays the card list information on the display unit 160 so that the user may perform a selection. The smart multi-card 100 may display all or some of the card list on the display unit 160 according to a size of the display unit 160 or the type, format, or number of pieces of card information to be displayed.

The smart multi-card 100 receives a card selected from the card list to perform reward accumulation or payment from the user through the user input unit 140 (S110). The user controls the user input unit 140 to select the card to perform payment or reward accumulation from among cards displayed on the display unit 160. For example, when the user input unit 140 includes directional buttons, the user may select the card to be used for payment by changing a card through manipulation of the directional buttons. Also, when the user input unit 140 includes numeric buttons, the user may enter a specific number to select a card corresponding to the number.

Also, when the user input unit 140 includes a touchscreen, the user input unit 140 may recognize a touch command of the user to perform card selection. That is, the user may change a card by tapping left and right edges of the display unit 160 or by touching the touchscreen and moving (e.g., swiping) along a predetermined route.

The smart multi-card 100 loads card information of the selected card and then performs payment or reward accumulation using the card information (S120). That is, the control unit 120 may load the card information of the selected card from the information storage unit 130 and perform payment or reward accumulation. A method in which the smart multi-card 100 performs payment based on the card information may include a contact payment method in which the smart multi-card 100 is brought into contact with or inserted into a contact payment terminal to perform payment, a contactless payment method in which the smart multi-card 100 is recognized by a contactless payment terminal to perform payment, and a method in which the smart multi-card 100 loads a card stored inside the communication device 200 to perform payment through a contact or contactless payment terminal.

The contact payment method in which the smart multi-card 100 is brought into contact with or inserted into a contact payment terminal to perform payment may include exchanging data such as card information or user information by physical contact between a contact part of the payment terminal and the connector 180 of the smart multi-card 100. The contactless payment method in which the smart multi-card 100 is recognized by a contactless payment terminal to perform payment may include performing payment without physical contact by communicating with the contactless payment terminal through an antenna by using radio frequency signals. That is, the contactless payment method may exchange data such as card information or user information through wireless communication such as NFC, BLE, and WiFi.

Also, an exemplary embodiment of the invention may further include an external port connection unit. The external port connection unit is configured to connect to an external power source to perform charging, or to connect to an external device to perform data exchange. That is, the smart multi-card 100 may be connected with an external power source through the external port connection unit to charge the power supply unit 150. Also, the smart multi-card 100 may be connected with an external device through the external port connection unit in a wired manner to exchange data with the external device. The external device refers to any type of device that may be connected to the smart multi-card 100 through cables of the communication device 200, a computer, etc. For example, the smart multi-card 100 may be connected to a device such as a computer in a wired manner to receive information on a card to be issued or registered. Also, for example, the smart multi-card 100 may be connected to a device in a wired manner to receive a variety of information such as setting information and user authentication information from the device. Thus, the smart multi-card 100 may exchange data at a higher speed than when the data is exchanged wirelessly.

Also, the display unit 160 may be configured to display the power level of the power supply unit 150. That is, the smart multi-card 100 may display the amount of remaining power at one side of the display unit 160 so that the user may check the power level while using the card and may also check charging progress during charging.

Also, the power supply unit 150 may include a wireless charging function. Wireless charging refers to charging without coupling a mobile device to a charger connected to an electrical outlet. Various wireless charging techniques may be applied to the smart multi-card 100. Also, the power supply unit 150 may perform wireless charging in an electromagnetic induction method. The electromagnetic induction method uses a principle of electromagnetic induction in which, when a magnetic field is generated by a power transmission coil, electricity is induced at a reception coil due to influence of the generated magnetic field. That is, the power supply unit 150 may include an iron core positioned around the card and may be charged by a varying a magnetic field when the power supply unit 150 is located near a wireless charging device in which an alternating current is flowing. Also, for example, the power supply unit 150 may perform wireless charging through a magnetic resonance method or an electromagnetic wave method. The magnetic resonance method is a method in which, when electromagnetic waves are generated by a transmitter, a receiver receives the generated electromagnetic waves and converts the received electromagnetic waves into electric power by using a rectenna, which is a combination of an antenna and a rectifier. The electromagnetic wave method is a technique in which a transmission coil generates a magnetic field vibrating at a resonance frequency and energy is focused only at a reception coil designed with the resonance frequency. Ampere's law and Faraday's law are commonly applied to the electromagnetic induction method, the electromagnetic wave method, and the magnetic resonance method. Also, when payment is performed by a contactless card terminal, the smart multi-card 100 may partially charge a power source through magnetic induction. Thus, the inconvenience of charging the power before using the card may be eliminated or reduced. Also, the smart multi-card 100 may be charged at any place provided with a wireless charger (e.g., a restaurant or café provided with a magnetic resonance wireless charger), and may be simply used without worrying about charging.

Also, an exemplary embodiment of the invention may further include a solar cell (or a photovoltaic cell). Solar power generation is a method of generating power by converting sunlight into electrical energy using photovoltaic cells without help of power generators, and the solar cell may charge the power supply unit 150. A conventional photovoltaic cell technology may be applied to the solar cell. For example, the solar cell is formed of p-n junction semiconductor, and the free electrons in the semiconductors increased by sunlight may charge the power supply unit 150. However, the technology applied to the solar cell is not limited thereto, and various conventional solar cell technologies that have been developed may be applied. The solar cell may be provided on the rear surface of the frame 110. That is, the smart multi-card 100 provided with the solar cell may be charged by positioning the smart multi-card 100 at a place where the sun shines such that the rear surface is exposed to sunlight.

Also, the control unit 120 may include a payment control module configured to control a card payment function and an operation control module configured to control operations other than payment of the smart multi-card 100. The payment control module may be included in the information storage unit 130. The information storage unit 130 (e.g., an integrated circuit (IC) chip) may include a payment control module (e.g., a payment micro-control unit (MCU)) configured to control a card payment function, like a conventional smart card including information on a single card. Thus, the smart multi-card 100 may be manufactured with the information storage unit (the IC chip) 130 that is used to manufacture conventional smart cards. Also, conventional IC chip manufacturing processes may be utilized with no change, and IC chips of the conventional smart cards may be recycled.

Also, an exemplary embodiment of the invention may further include an interface unit. When the information storage unit 130 and the control unit 120 have different data formats, the interface unit may transform the different data formats into the same format. The interface unit may be connected between the control unit 120 and the information storage unit 130 in the smart multi-card 100 as a separate chip to perform transformation when data is delivered thereto. According to the exemplary embodiments, the interface unit may be a software included in the control unit 120 or the information storage unit 130.

Also, the smart multi-card 100 may be switched between an idle state and an active state by manipulating the user input unit 140. When the smart multi-card 100 is kept turned on even when the user does not use the smart multi-card 100, power consumption thereof may increase. Thus, the smart multi-card 100 may be switched to the idle state when there is no manipulation of the user for a predetermined time or more. The idle state refers to a state in which some elements of the smart multi-card 100 are deactivated. When an input is received from the user through the user input unit 140 during the idle state, the smart multi-card 100 may be switched back from the idle state to the active state. Thus, the smart multi-card 100 may reduce unnecessary power consumption, and also reduce or prevent overload in the smart multi-card 100. Accordingly, the smart multi-card 100 may have an extended life time.

Also, the information storage unit 130 may store a user setting item regarding operation of the smart multi-card 100. For example, the setting item may include, but not limited to, a time which the idle state of the smart multi-card 100 starts after the user's last use, a brightness of the display unit 160, a shape of a UI displayed on the display unit 160, etc.

That is, the control unit 120 may generate a UI for receiving a setting item from the user through information processing and provide the generated UI to the display unit 160. The user input unit 140 may receive desired setting information from the user. Subsequently, the information storage unit 130 may store the received setting information.

Also, the information storage unit 130 may store setting information of a frequently-used card. When the smart multi-card 100 is changed from the idle state to the active state, the setting information of a frequently-used card may be loaded from the information storage unit 130. That is, the smart multi-card 100 may store a card that is frequently used by the user in the information storage unit 130 according to a method of storing a setting item. According to exemplary embodiments, when the smart multi-card 100 switched from the idle state to the active state, the smart multi-card 100 may display the frequently-used card as a means for payment, thus reducing time and inconvenience when a user selects a card for payment.

Also, as shown in FIG. 5, when the smart multi-card 100 is linked with the communication device 200, the control unit 120 may recognize whether wireless communication signals (e.g., BLE signals) are being received from the communication device 200 and may stop operating the smart multi-card 100 when the signals are not received. That is, the smart multi-card 100 may receive a specific wireless signal transmitted by the communication device 200 and may recognize a distance therebetween. For example, when the smart multi-card 100 receives a beacon signal transmitted by the communication device 200 and calculates a distance therebetween, the smart multi-card 100 may stop operating when the calculated distance exceeds a predetermined distance. Also, for example, the signal transmitted by the communication device 200 may be set to a predetermined level so that the signal may be transmitted up to a specific distance. In this case, when the smart multi-card 100 does not receive the wireless communication signal, the smart multi-card 100 may stop operating because a lack of reception of the signal corresponds to the smart multi-card 100 being outside the predetermined distance.

Also, when the smart multi-card 100 is outside the predetermine distance from the communication device 200, the smart multi-card 100 may generate an alarm. Users often lose their communication devices 200, for example, by leaving the communication devices 200 in restaurants. The smart multi-card 100 may determine whether the smart multi-card 100 is outside the predetermined distance from the communication device 200 on the basis of the wireless communication signal transmitted by the communication device 200. When the smart multi-card 100 is outside the predetermined distance, the smart multi-card 100 may provide an alarm to the user and inform the user that the communication device 200 has been left in another place. Thus, when the user holds the smart multi-card 100, the user may receive a notification of whether the communication device 200 has been lost through the smart multi-card 100.

Also, the wireless communication unit 170 may receive information on a payment history or reward accumulation history from the card terminal or the communication device 200. The control unit 120 may perform information processing so that the information may be displayed on the display unit 160. The display unit 160 may visually display a payment history. That is, the wireless communication unit 170 may receive information data on the payment history or reward accumulation history from a card terminal or the communication device 200 during payment. The control unit 120 may perform information processing so that the information data on the payment history or reward accumulation history may be displayed on the display unit 160. The display unit 160 may provide the information to the user by visually displaying the information. Thus, since the user may immediately check the payment history or reward accumulation history without receiving a receipt, the cost required to print the receipt may be reduced.

Also, the smart multi-card 100 may transmit the received payment history to the communication device 200 through wireless communication in response to the user's selection. That is, only payment history information needed by the user may be transmitted from the smart multi-card 100 to the communication device 200 through wireless communication. The smart multi-card 100 may transmit the payment history information in response to a specific input that is entered by the user through the user input unit 140. Thus, the user may transmit payment history information that needs to be stored to the communication device 200 and store the payment history information even though a receipt is not issued, and may immediately utilize accumulated data, for example, to create a household accounting book on the basis of the payment history information. Also, the user may reduce costs by avoiding use of a commercial payment messaging service to check and store the payment information in the communication device 200.

Also, an exemplary embodiment of the invention may further include a magnetic strip driving unit. The magnetic strip driving unit serves to generate a magnetic strip on the basis of the card information processed by the control unit 120. That is, the smart multi-card 100 includes a magnetic strip provided on the rear surface of the frame 110. The magnetic strip driving unit may change a magnetic arrangement of the magnetic strip in response to information on a card selected by the user. Thus, the user may use the magnetic strip of the smart multi-card 100 to make the payment when an IC card terminal is not available. Also, the smart multi-card 100 may select one of payment using an IC chip and payment using a magnetic strip as a payment method according to the user's manipulation of the user input unit 140.

According to the invention, the following various effects can be obtained.

First, the smart multi-card according to an exemplary embodiment of the invention may improve ease of carrying cards because all card data for payment and accumulation is stored into a single card. Also, wallet weight of the user may be reduced by reducing the number of cards carried by the user.

Second, the smart multi-card according to an exemplary embodiment of the invention may include a wireless communication unit, a connector, and a magnetic strip, and thus can provide various payment methods such as a payment method using a magnetic strip, a contact payment method, a contactless payment method, and a payment method using a communication device. Accordingly, the user may apply a method corresponding to the user's situation to perform payment.

Third, the smart multi-card may be linked with a communication device, and thus disallow payment when a distance between the smart multi-card and the communication device is at a certain distance or more. Thus, the security of personal information may be improved and an unauthorized payment when a card is lost or stolen may be prevented or reduced.

Fourth, the smart multi-card may be issued or stored through a wired connection with another device such as a communication device or a wireless connection with a card terminal or a communication device. Accordingly, information on several cards may be stored in a single card.

Fifth, the smart multi-card may display card information through a display unit, thus allowing the user to check which card is selected for payment.

Sixth, the smart multi-card may include a user input unit so that the user may easily manipulate a card. In particular, the user input unit and a display unit may be a touchscreen, and the touchscreen improves convenience in that card manipulation can be immediately performed while the display unit is being checked, and the smart multi-card may have reduced thickness because separate input elements such as a keypad may be omitted.

Seventh, the smart multi-card may include a idle mode function. Accordingly, unnecessary power consumption thereof may be reduced and therefore, the number of times required for charging may be reduced. Thus, the smart multi-card may have improved power management and may reduce the concern and inconvenience of the user to frequently charge the smart multi-card.

Eighth, the smart multi-card may store and display a card that is frequently used by the user by a frequently used card setting function. Thus, the time spent by the user to select the frequently-used card and load card information thereof may be reduced and payments may be made immediately.

Ninth, the smart multi-card may include a solar cell, and thus may be charged anywhere under the sunlight. Thus, the user may not need to find a separate charging place. Also, the solar cell can be provided at one side of a rear surface of a frame on which separate elements of the smart multi-card are not disposed. Thus, charging the smart multi-card using the solar cell by only exposing the rear surface to sunlight to eliminate or reduce inconvenience with the user's use of the smart multi-card.

Tenth, the smart multi-card may be conveniently charged through wireless charging. Wireless charging may have improved convenience in that the user may charge the smart multi-card at a wireless charging station without directly connecting the card to a power source. Wireless charging may also have improved convenience in that the user may automatically charge and use the smart multi-card with less concern of charging the smart multi-card.

Eleventh, the smart multi-card may receive information on a payment history or reward accumulation history from a card terminal. Thus, the user may immediately check the payment history or the reward accumulation history without receiving a receipt. Also, it is possible to reduce costs required to print a receipt.

Twelfth, the smart multi-card may transmit received payment history information to a communication device. Thus, the user may transmit payment history information that needs to be stored to the communication device and store the payment history information even though a receipt is not issued and may immediately utilize accumulated data, for example, to create a household accounting book on the basis of the payment history information. Also, the user may reduce costs by avoiding use of a commercial payment messaging service to check and store the payment information in the communication device.

Thirteenth, the costs for manufacturing multiple cards that are unnecessarily issued and discarded may be reduced by using only one smart multi-card for each user to perform payment or reward accumulation.

Embodiments of the invention have been described above with reference to the accompanying drawings. Those skilled in the art should understand that various changes in form and details may be made therein without departing from the spirit and scope of the invention as defined by the appended claims. The above embodiments are accordingly to be regarded as illustrative rather than restrictive.

What is claimed is:

1. A smart multi-card comprising:
   a frame;
   a wireless communication unit configured to transmit or receive data to or from a card terminal or a communication device through wireless communication;
   an information storage unit configured to store card information relating to a plurality of cards;
   a user input unit configured to receive a user input from a user to select card information corresponding to one of the plurality of cards;
   a display unit configured to visually display the selected card information; and
   a processor configured to extract the card information selected by the user from the information storage unit, process the card information, deliver the processed card information to the display unit, and process the data transmitted or received through the wireless communication unit,
   wherein the smart multi-card has idle and active states and is switchable from the idle state to the active state in response to user input received through the user input unit.

2. The smart multi-card of claim 1, further comprising:
   a connector configured to exchange data with a contact card terminal.

3. The smart multi-card of claim 2, wherein the display unit is configured to display a type of the identification card, when the selected card is a user identification card; and
   wherein the processor is configured to process information of the user identification card loaded from the information storage unit and deliver the processed information to the wireless communication unit or the connector.

4. The smart multi-card of claim 1, wherein the wireless communication unit includes a Bluetooth low energy (BLE) module configured to receive card information from the communication device or receive a control command of the smart multi-card from the communication device; and
   wherein the processor is configured to transform the card information into a format corresponding to a storage format of the information storage unit.

5. The smart multi-card of claim 1, wherein the wireless communication unit includes a near field communication (NFC) module configured to exchange data with the communication device through wireless communication or perform contactless payment through the card terminal.

6. The smart multi-card of claim 1, further comprising:
   an interface unit configured to transform data formats of the information storage unit and the processor into the same format when the data formats are different.

7. The smart multi-card of claim 1, further comprising:
   a power supply unit configured to supply power to the smart multi-card; and
   an external port connection unit configured to connect to an external power source to perform charging or connect to an external device to perform data exchange therewith.

8. The smart multi-card of claim 7,
   wherein the power supply unit is wirelessly chargeable.

9. The smart multi-card of claim 7, further comprising:
   a solar cell provided on a surface of the card frame and configured to charge the power supply unit.

10. The smart multi-card of claim 1, wherein the information storage unit stores settings for a frequently-used card; and wherein information corresponding to the frequently-used card is loaded from the information storage unit when the smart multi-card is switched from the idle state to the active state.

11. The smart multi-card of claim 1, wherein the user input unit comprises at least one of a button input method in which a card is changed or selected by directional buttons and a selection button and a touch pad method in which a card is changed or selected by receiving a touch operation input from the user.

12. The smart multi-card of claim 1, wherein the display unit is configured to display the card information including at least one of a bar code, a card number, and a Quick Response (QR) code, when the selected card is a reward card.

13. The smart multi-card of claim 1, wherein the display unit and the user input unit comprise a touchscreen.

14. The smart multi-card of claim 1, wherein the display unit comprises electronic paper.

15. The smart multi-card of claim 1, wherein the processor is configured to generate a user interface for receiving setting items from the user through information processing and provide the generated user interface to the display unit; and wherein the information storage unit stores the setting items received from the user through the user input unit.

16. The smart multi-card of claim 1, wherein the processor is configured to recognize a wireless communication signal received from the communication device when the smart multi-card is linked with the communication device, and configured to stop the operation of the smart multi-card in response to the wireless communication signal not being received.

17. The smart multi-card of claim 1, wherein the wireless communication unit is configured to receive information relating to a payment history or reward accumulation history from the card terminal; and wherein the processor is configured to process the received information to display the information on the display unit; and wherein the display unit is configured to display the payment history or reward accumulation history.

18. The smart multi-card of claim 1, wherein the processor comprises a payment control module configured to control a card payment function and an operation control module configured to control operations of the smart multi-card other than payments.

19. The smart multi-card of claim 1, further comprising:

a magnetic strip driving unit configured to generate a magnetic strip based on the card information processed by the processor.

* * * * *